United States Patent [19]

McKinnon

[11] Patent Number: 4,959,250
[45] Date of Patent: * Sep. 25, 1990

[54] SIMULATED MARBLE

[76] Inventor: Gordon McKinnon, 119 S. Oregon Ave., Tampa, Fla. 33606

[ * ] Notice: The portion of the term of this patent subsequent to Jan. 26, 2005 has been disclaimed.

[21] Appl. No.: 122,398

[22] Filed: Nov. 19, 1987

Related U.S. Application Data

[63] Continuation-in-part of Ser. No. 861,233, May 7, 1986, Pat. No. 4,721,634.

[51] Int. Cl.$^5$ .................. B44F 9/04; B05D 3/12; B05D 5/00; B32B 3/10
[52] U.S. Cl. .................... 428/15; 427/263; 427/264; 427/265; 427/268; 427/270; 427/309; 428/142; 428/143; 428/207
[58] Field of Search .......... 427/263, 264, 265, 268, 427/270, 309; 428/15, 142, 143, 207

[56] References Cited

U.S. PATENT DOCUMENTS 3,341,396 9/1967 Iverson ..................... 427/268 X
3,712,825 1/1973 Yocum ....................... 427/264
4,721,634 1/1988 McKinnon .................... 427/263

Primary Examiner—Evan Lawrence
Attorney, Agent, or Firm—Frijouf, Rust & Pyle

[57] ABSTRACT

A process for covering a substrate with a textured simulated marble surface and the resulting product. In the process, cement and sand are mixed to form a first mixture to which is added an aqueous solution of an adhesive resin such as an acrylic resin to create a first mortar. The cement and sand are mixed to form a second mixture to which is added an aqueous solution of an adhesive resiin such as an acrylic resin to create a second mortar. A contrasting pigment is added to one of the first and second mortars or to each of the mortars. The first mortar is applied over the entire substrate. The second mortar is applied onto randomly spaced portions over the previously applied first mortar prior to the complete curing of the first mortar to form a unitary textured covering. The textured unitary coating includes a lower layer and an upper layer with the upper layer comprising the second mortar and the lower layer comprising the first and second mortar. The contrasting pigment in the one of the first and second mortars is allowed to commingle with the other of the first and second mortars to enable the pigmented areas to blend with other pigmented areas, if present, and with the non-pigmented areas. Substantially only the blended upper layer of the unitary textured covering of the substrate is lightly troweled to simulate a marble surface.

19 Claims, 2 Drawing Sheets

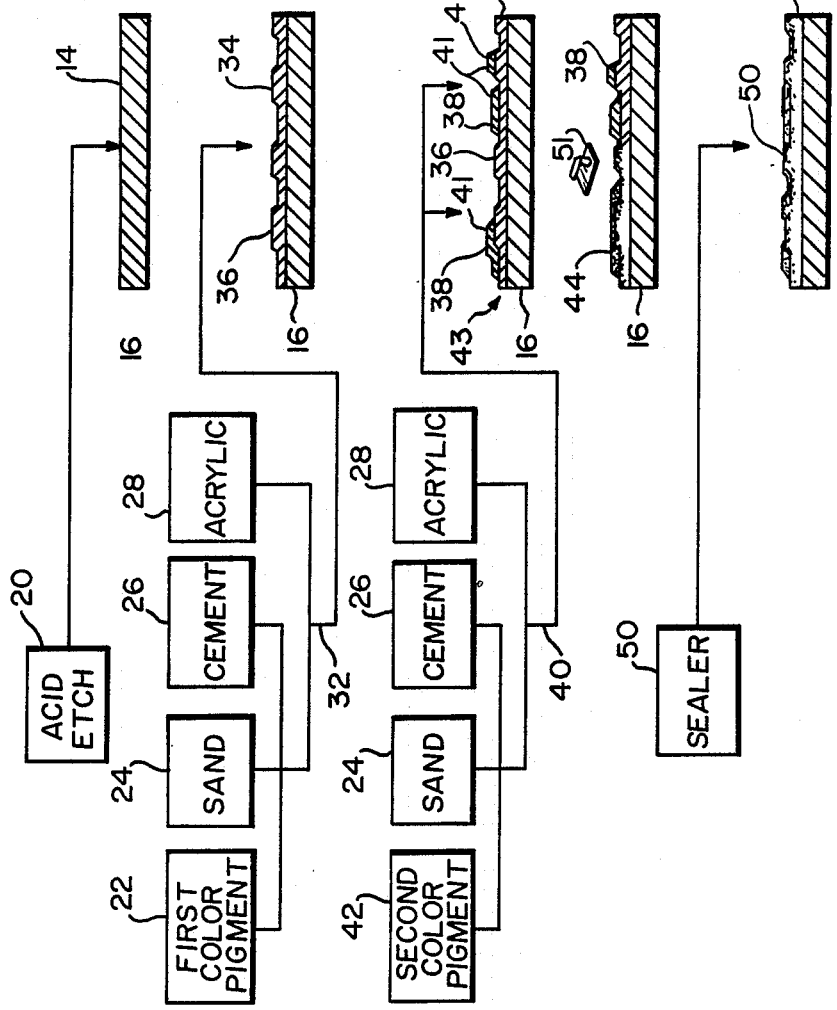

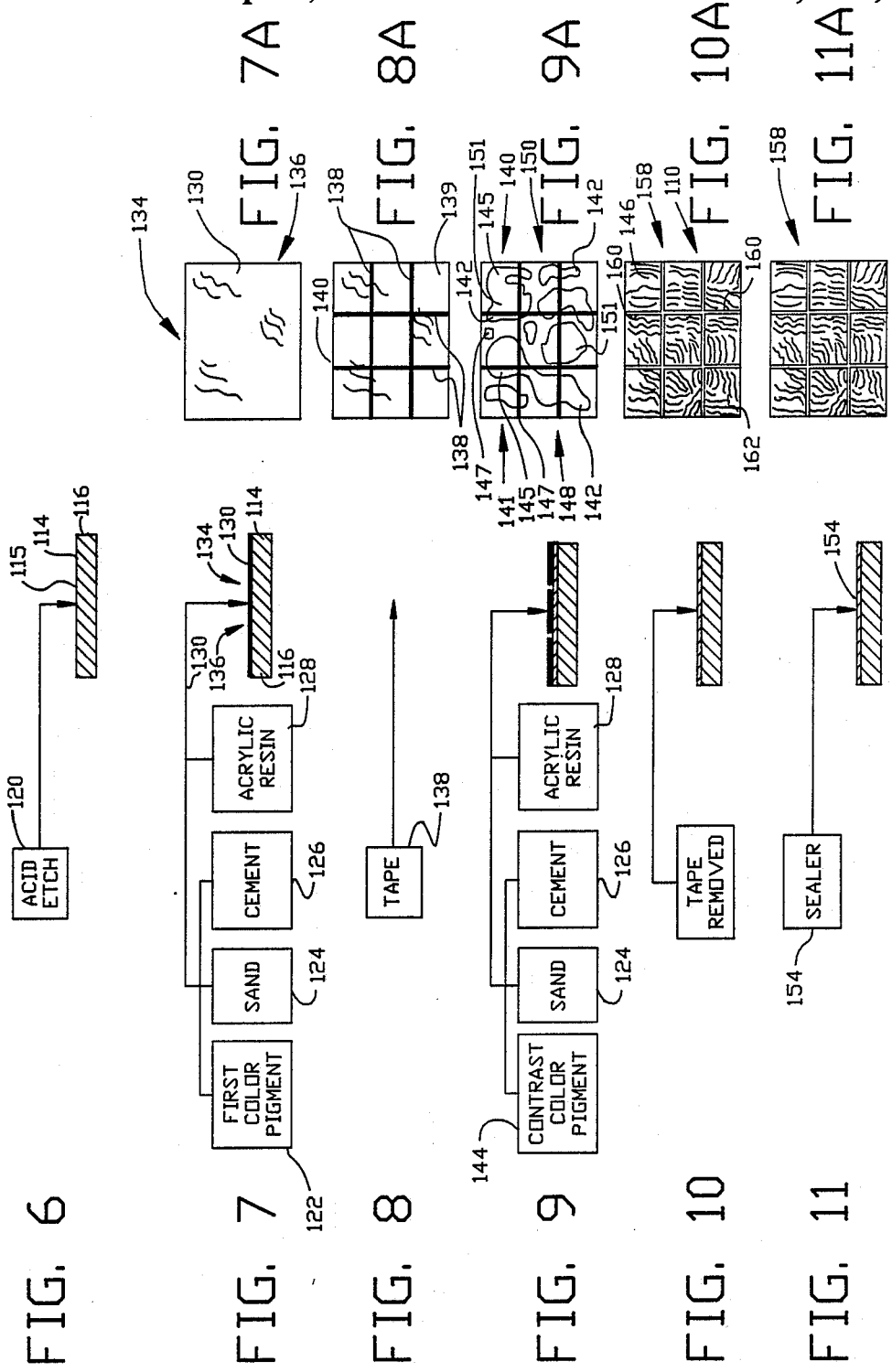

SIMULATED MARBLE

RELATED APPLICATION

This application is a continuation-in-part of application Ser. No. 861,233 filed May 7, 1986, now U.S. Pat. No. 4,321,634, the disclosure of which is incorporated herein by reference as if fully set forth herein.

BACKGROUND OF THE INVENTION

1. Field of the Invention

This invention relates to cementitious coating of a surface, and more particularly to making a textured simulated marble surface and to making a ceramic-like surface on existing or new substrates such as flooring, driveways, patios, pool decking, decorative walls and the like.

2. Description of the Related Art

Various methods have been devised by the prior art for producing simulated brick, tile and the like. One method of producing simulated bricks or tiles, for example, involves preparing a mixture of cement, water and water-based adhesives having a consistency of mortar which is applied to a wall or floor then allowed to partially set. Scoring indentations are made to remove cement after which mortar is placed in the indentations produce the desired simulated brick appearance.

Another method utilizes a straight edge tape releasably attached to a substrate in the form of square or rectangle grout lines. A covering over the entire substrate is applied over the taped substrate. After curing, the tape is removed from the substrate to reveal simulated grout lines.

A popular method of coating concrete driveways, pool decks, walls and the like involves coating the surface with a color or pigment composition. These compositions are available as cement water paint, alkyd-type enamel, resin-emulsion paint, oil paint, rubber-base paint, polyvinyl acetate emulsions, polyester paint, epoxy paint and silicon sealers. These compositions, however, do not produce either a ceramic-like or a marble-like appearance.

Another method of color enhancing concrete involves mixing color pigments, either natural or synthetic, into the dry cement powder beforehand or by dusting it on afterward. When the color pigment is added to the dry cement mix, the color pigment is preferably put through a sieve to insure even blending. If the surface is not too large such that the mortar will set before finishing, the color pigment may be applied by "dusting" the color pigment onto the concrete slab after floating. Here the pigment is mixed with fine sand and scrubbed into the wet surface with a stiff brush and smooth troweled. These methods sometime result in an uneven or blotchy color and/or a color which looks faded in dry weather. These compositions, also fail to produce a coating simulating a marble or ceramic surface with color gradations.

SUMMARY OF THE INVENTION

Therefore, it is an object of this invention to provide an economical process of preparing a durable cementitious coating having a ceramic appearance or a durable cementitious coating having a simulated marble appearance.

Another object of this invention is to provide a process of preparing a cementitious marble-like or a cementitious ceramic-like surface which provides a tough surface which hardens to a marble-like or a ceramic-like surface, respectively, suitable for heavy pedestrian traffic.

Another object of this invention is to provide a process of preparing a simulated marble surface or a ceramic like surface which provides a tough surface which hardens to a surface suitable for heavy pedestrian traffic.

Another object of this invention is to provide a process of preparing a ceramic-like cementitious surface or marble-like cementitious surface which provides excellent adhesion to the substrate.

Another object of this invention is to provide a process of preparing a ceramic-like cementitious surface or marble-like cementitious surface which is skid resistant.

Another object of this invention is to provide a process of preparing a ceramic-like cementitious surface or marble-like cementitious surface which provides a clear intermix of contrasting and background colors suggestive of a ceramic surface or a marble surface, respectively.

Another object of this invention is to provide a process of preparing ceramic-like cementitious surface or marble-like cementitious surface where the selection of the contrasting colors is a matter of choice.

Another object of this invention is to provide a process of preparing cementitious surface which is structurally durable for surfacing driveways, pool decks and the like.

Another object of this invention is to provide a process of preparing ceramic-like cementitious surface or marble-like cementitious surface that may be applied to new or existing substrates to produce a simulated mottled and speckled ceramic surface having a speckled color gradation or to produce a marble-like surface, respectively.

Another object of this invention is to provide a process of preparing a marble-like surface which is textured in appearance.

The foregoing has outlined some of the more pertinent objects of the invention. These objects should be construed to be merely illustrative of some of the more prominent features and applications of the invention. Many other beneficial results can be attained by applying the disclosed invention in a different manner or modifying the invention within the scope of the disclosure. Accordingly, other objects and a fuller understanding of the invention may be had by referring to the remainder of the summary of the invention and the detailed description describing the preferred embodiments in addition to the scope of the invention which is defined by the claims taken in conjunction with the accompanying drawings.

The invention is defined by the appended claims with a specific embodiment shown in the attached drawings. For purposes of summarizing the invention, the invention may be incorporated into a process of preparing a simulated marble surface. The process for covering a substrate with a simulated marble surface comprises mixing cement and sand to form a first mixture to which is added an aqueous solution of an adhesive resin such as an acrylic resin to create a first liquid mortar. Cement and sand are mixed to form a second mixture to which is added an aqueous solution of an adhesive resin such as an acrylic resin to create a second liquid mortar. A contrasting pigment is added to and evenly mixed and dispersed throughout one of the first and second liquid mortars. The first liquid mortar is applied to the substrate to form a first textured coat on the substrate. The second liquid mortar is applied onto randomly spaced portions of the first coating prior to the complete curing of the first coating enabling the first and second coatings to form a unitary textured covering for the substrate with the contrasting pigment being randomly spaced in the textured unitary covering. The textured unitary coating has a lower layer and an upper layer with the upper layer comprising the second liquid mortar and the lower layer comprising the first and second liquid mortar. The contrasting pigment in the one of the first and second liquid mortars is allowed to commingle with the other of the first and second liquid mortars to enable the pigmented areas to blend with the non-pigmented areas. Lightly troweling substantially only the blended upper layer of the unitary textured covering of the substrate to simulate a marble surface. The invention also embraces the marbleized covering of a substrate comprising the covering prepared by the above process.

In a further embodiment of the process for covering a substrate with a simulated marble surface comprises mixing cement and sand to form a first mixture and adding an aqueous solution of an adhesive resin to the first mixture to create a first liquid mortar. A second mixture is prepared by mixing cement and sand and an aqueous solution of an adhesive resin is added to the second mixture to create a second liquid mortar. A contrasting pigment is added and mixed to each one of the first and second mortars such that color of the first mortar contrasts with the color of the second mortar. The first liquid mortar is applied onto the substrate to form a first textured coat on the substrate. The second liquid mortar is applied onto randomly spaced portions of the first coating prior to the complete curing of the first coating enabling the first and second coatings to form a unitary textured covering for the substrate with the contrasting pigment being randomly spaced in the textured unitary covering with the textured unitary coating having a lower layer and an upper layer with the lower layer comprising the first and second liquid mortar and the upper layer comprising the second liquid mortar. The contrasting pigment in each of the first and second liquid mortars is allowed to commingle with the other of the first and second liquid mortars to enable the contrasting pigmented areas of the first mortar to blend with the contrasting pigmented areas of the second mortar. The blended upper layer of the unitary textured covering on the substrate is troweled to simulate a marble surface. The invention also embraces the marbleized covering of a substrate comprising the covering prepared by the above process.

In another embodiment of the invention a process for covering a substrate with a simulated marble surface comprises mixing cement and sand to form a first mixture and adding an aqueous solution of adhesive resin to the first mixture to create a first liquid mortar. A second mixture of cement and sand is prepared and an aqueous solution of adhesive resin is added to the second mixture to create a second liquid mortar. A third mixture of cement and sand is prepared and an aqueous solution of adhesive resin is added to the third mixture to create a third liquid mortar. A first contrasting pigment is mixed to one of the first, second and third mortars. A second contrasting pigment which contrasts with the first contrasting pigment is added to one of the first, second and third mortars which does not contain the first contrasting pigment. The first liquid mortar is applied onto the substrate to form a first textured coat on the substrate. The second liquid mortar is applied onto randomly spaced portions of the first coating prior to the complete curing of the first coating. The third liquid mortar is applied onto randomly spaced portions of the first coating prior to the complete curing of the first coating enabling the first, second and third coatings to form a unitary textured covering of the substrate with the first and second contrasting pigment being randomly spaced in the textured unitary covering with the textured unitary coating having a lower layer and an upper layer with the lower layer comprising the first, second and third liquid mortars and the upper layer comprising the second and third liquid mortars. The first contrasting pigment in the one of the first, second and third liquid mortars and the second contrasting pigment in one of the first, second and third liquid mortars which does not contain the first contrasting pigment are allowed to commingle with the other of the first, second and third liquid mortars to enable the pigmented areas to blend with the non-pigmented areas. The blended upper layer of the unitary textured covering of the substrate is troweled to simulate a marble surface having contrasting pigments. The invention also embraces the marbleized covering of a substrate comprising the covering prepared by the above process.

In another embodiment of the invention the process for covering a substrate with a simulated marble surface comprises mixing cement and sand to form a plurality of mixtures where each mixture of the plurality of mixtures comprises a single mixture of cement and sand. An aqueous solution of an adhesive resin is added to the each single mixture of the plurality of mixtures to create a plurality of single mixtures of liquid mortars. A plurality of contrasting pigments is provided. A contrasting pigment selected from the plurality of contrasting pigments is added to at least one of the single mixtures of the plurality of liquid mortars such that the resulting pigment color of the single mixture liquid mortar to which a contrasting pigment has been added contrasts with the other liquid mortars. The plurality of liquid mortars are divided into a first portion of single mixture liquid mortars and a second portion of single mixture liquid mortars. Each single mixture of the first portion of liquid mortars is individually applied onto the substrate to form a first textured coat on the substrate. Each single mixture of the second portion of liquid mortars is individually applied onto randomly spaced portions of the first textured coat prior to the complete curing of the first textured coat to enable the first and second coatings to form a unitary textured covering for the substrate with the contrasting pigments being randomly spaced in the textured unitary covering with the textured unitary coating having a lower layer and an upper layer with the lower layer comprising the first and second portions of liquid mortar and the upper layer comprising the second portion of liquid mortars. The contrasting pigments in the liquid mortars are allowed to commingle with the other of the liquid mortars and the pigmented areas to blend with the non-pigmented areas. The blended upper layer of the unitary textured covering of the substrate is troweled to simulate a marble surface having contrasting pigments. The invention also embraces the marbleized covering of a substrate comprising the covering prepared by the above process.

In a further embodiment of the invention the liquid mortars are of a viscosity capable of being sprayed through a spray gun to enable liquid mortars to be applied by spraying. Preferably, each of the liquid mortars are applied by spraying using a spray texture gun such as a Kraft Texture Gun which mixes the mortar and air to produce a textured surface by spraying. Preferably, the first portion of single mortars on first mortar is sprayed through a small bore air tip to provide a fine textured appearance and the second portion of single mortars the second mortar is sprayed through a larger bore air tip to provide a coarse textured appearance. Preferably, the small bore air tip has a diameter of 3/32 of an inch and the large bore air tip has a diameter of ⅛ of an inch. The first liquid mortar is applied at about 15 pounds per square inch and the second liquid mortar is applied at about 20 to 22 pounds per square inch. The higher pressure for the second liquid mortar insures better color penetration or commingling and blending.

An optional protective clear coating may be applied to the simulated marble surface to prevent premature aging of the simulated marble surface. Generally, the clear coating includes sun screens to protect against color fading and sealants to provide water resistance to the simulated marble surface. The clear coating is selected from acrylic, epoxide, or polyurethane and the like based coatings containing sun screens and sealants known in the art. The application of a clear coating to the surface provides protection to the simulated marble surface without interfering with the inherent skid resistance of the simulated marble surface. Skid resistance is desired in an outdoor or wet location. Application of a large number of clear coats tends to level the surface of the simulated marble and to reduce or possibly eliminate the skid resistance of the simulated marble surface.

The preferred substrate is concrete. However, where the concrete surface is older than about 24 hours from the time the substrate concrete was poured, the substrate concrete must be acid-etched prior to applying the first liquid mortar. This insures a bonding between the concrete and the first liquid mortar of the lower layer. The preferred acid to degrease and etch concrete is hydrofluoric acid.

The contrasting pigment may be added to either a concrete and sand mixture or to the liquid mortar prepared therefrom. That is, the sequence is not critical to the process of preparing either the marbleized surface as disclosed above or the ceramic surface as disclosed below.

The invention may be further incorporated into a process of preparing a simulated speckled ceramic surface having a cementitious composition. The process for covering a substrate with a cementitious simulated ceramic surface having a mottled, speckled appearance comprises providing a cementitious substrate and mixing cement and sand to form a second mixture. An aqueous solution of an adhesive resin is added to the second mixture to create a second liquid mortar. The second liquid mortar is applied onto randomly spaced portions of the cementitious substrate to create a noncontiguous thickened cementitious coating having a high viscosity to prevent spreading of the second liquid mortar over the surface of the cementitious substrate without troweling. The noncontiguous thickened cementitious coating is troweled to form a plurality of interconnecting and non-interconnecting flattened and level plateaus partially covering the cementitious substrate to provide flattened speckles partially covering the cementitious substrate. The troweled coating is allowed to cure to reveal the cementitious substrate partially covered with a flattened and shaped pattern over the cementitious substrate simulating a mottled, speckled ceramic covering. The invention also embraces the ceramic-like covering of a substrate comprising the covering prepared by the above process.

Preferably, the second mortar is applied by spraying onto the surface of the cementitious substrate.

The cementitious substrate is preferably concrete. In order to enhance the bonding between the concrete cementitious substrate and the second liquid mortar, the concrete cementitious substrate is preferably acid-etched prior to applying the second mixture.

The process may further include adding and mixing a contrasting pigment to the second mixture such that the second mortar has a color which contrasts with the color of the cementitious substrate.

Preferably, a coating is applied to seal and protect the cementitious coatings against accelerated aging caused by sun and water. Such coating may be selected from acrylics, epoxides, and urethanes base coatings known in the art.

In another embodiment of the invention strips of straight edge tape are positioned and releasably secured in the shape of grout lines between tile onto the cementitious substrate prior to coating the cementitious substrate with the second mortar. The taped cementitious substrate is then coated with the second liquid mortar as described above. The noncontiguous thickened cementitious coating is then troweled and allowed to cure. The tape releasably secured to the cementitious substrate is then removed to reveal the cementitious substrate partially covered with a flattened and shaped pattern over the cementitious substrate simulating a mottled, speckled ceramic appearance and to reveal the cementitious substrate representing grout lines where the second mortar covered the tape to yield grout lines of the cementitious substrate simulating a plurality of mottled and speckled ceramic tiles.

In another embodiment of the invention the cementitious substrate is first prepared by mixing cement and sand to form a first mixture by adding an aqueous solution of an adhesive resin to the first mixture to create a first liquid mortar having a low viscosity to enable the first liquid mortar to be evenly applied on to the surface of a base. The first liquid mortar is applied to the entire surface of the base to create a contiguous cementitious coating on the base. The first liquid mortar is allowed to cure to form a cementitious substrate. A contrasting pigment may be added and mixed to at least one of the first and second mixtures such that one of the first and second mortars has a color which contrasts with the color of the other one of the first and second mortars. The invention also embraces the ceramic-like covering of a substrate comprising the covering prepared by a above process.

Preferably, the first mortar is squeegeed onto the surface of the base to provide a thin contiguous cementitious coating over the entire surface of the base.

The base may be either cementitious or non-cementitious. Such noncementitious bases include wood and hardboard. Where the base is cementitious, the color may be changed by including a color pigment in the first liquid mortar.

A more specific embodiment of the invention includes a process for covering a non-cementitious base comprising mixing cement and sand to form a first mixture and adding an aqueous solution of an adhesive resin to the first mixture to create a first liquid mortar having a low viscosity. Cement and sand are mixed to form a second mixture. An aqueous solution of an adhesive resin is added to the second mixture to create a second liquid mortar of higher viscosity than the first liquid mortar to prevent spreading over the surface of the cured contiguous cementitious coating without troweling. A contrasting pigment is added and mixed to at least one of the first and second mixtures such that one of the first and second mortars has a color which contrasts with the color of the other one of the first and second mortars. A non-cementitious base, such as wood or hardboard, is provided. The first liquid mortar is applied to the non-cementitious base to create a contiguous cementitious coating thereon. The contiguous cementitious coating is allowed to cure thereby forming a cementitious substrate. Strips of straight edge tape in the shape of grout lines between tile are positioned and releasably secured onto the cured surface of the contiguous cementitious substrate. The second liquid mortar is applied onto randomly spaced portions of the previously cured and taped contiguous cementitious substrate to create a noncontiguous thickened cementitious coating having a high viscosity to prevent spreading of the second liquid mortar over the surface of the cured cementitious substrate. The noncontiguous thickened cementitious coating is troweled to form a plurality of interconnecting and non-interconnecting flattened and level plateaus partially covering the cementitious substrate to provide flattened speckles partially covering the cementitious substrate. The troweled noncontiguous coating is allowed to cure. The tape releasably secured to the cementitious substrate is removed to reveal the cementitious substrate partially covered with a flattened and shaped pattern over the cementitious substrate simulating a mottled, speckled ceramic tile and to reveal the cementitious substrate representing grout lines where the second mortar covered the tape to yield grout lines of the cementitious substrate simulating a plurality of mottled and speckled ceramic tiles. The invention also embraces the ceramic-like covering of a substrate comprising the covering prepared by the above process.

A specific embodiment of the invention further includes a process for covering a non-cementitious base which comprises mixing cement and sand to form a first mixture and adding an aqueous solution of an adhesive resin to the first mixture to create a first liquid mortar having a low viscosity. Cement and sand are mixed to form a second mixture and an aqueous solution of an adhesive resin is added to the second mixture to create a second liquid mortar of higher viscosity than the first liquid mortar to prevent spreading over the surface of the cured contiguous cementitious coating. A contrasting pigment is added and mixed to at least one of the first and second mixtures such that one of the first and second mortars has a color which contrasts with the color of the other one of the first and second mortars. A non-cementitious base is provided. The first liquid mortar is applied to the non-cementitious base to create a contiguous cementitious coating thereon. The contiguous cementitious coating is allowed to cure thereby forming a cementitious substrate. The second liquid mortar is then applied onto randomly spaced portions of the previously cured contiguous cementitious substrate to create a noncontiguous thickened cementitious coating having a high viscosity to prevent spreading of the second liquid mortar over the surface of the cured cementitious substrate. The noncontiguous thickened cementitious coating is troweled to form a plurality of interconnecting and non-interconnecting flattened and level plateaus partially covering the cementitious substrate to provide flattened speckles partially covering the cementitious substrate. The troweled noncontiguous coating is allowed to cure to reveal the cementitious substrate partially covered with a flattened and shaped pattern over the cementitious substrate simulating a mottled, speckled ceramic appearance. The invention also embraces the ceramic-like covering of a substrate comprising the covering prepared by the above process.

In a specific embodiment the process includes covering a substrate with a cementitious simulated ceramic tile surface having a mottled, speckled appearance comprising providing a contiguous cementitious substrate. Strips of straight edge tape in the shape of grout lines between tile are positioned and releasably secured onto the surface of the cementitious substrate. A second liquid mortar is applied onto randomly spaced portions of the previously cured and taped contiguous cementitious substrate to create a noncontiguous thickened cementitious coating having a high viscosity to prevent spreading of the second liquid mortar over the surface of the cementitious substrate. The noncontiguous thickened cementitious coating is troweled to form a plurality of interconnecting and non-interconnecting flattened and level plateaus partially covering the cementitious substrate to provide flattened speckles partially covering the cementitious substrate. The troweled noncontiguous coating is allowed to cure. The tape releasably secured to the cementitious substrate is removed to reveal the cementitious substrate partially covered with a flattened and shaped pattern over the cementitious substrate simulating a mottled, speckled ceramic tile and to reveal the cementitious substrate representing grout lines where the second mortar covered the tape to yield grout lines of the cementitious substrate simulating a plurality of mottled and speckled ceramic tiles. The invention also embraces the ceramic-like covering of a substrate comprising the covering prepared by the above process.

Preferably, the noncontiguous coating is applied by spraying over the cured contiguous substrate. The sprayer sprays blotches of the second liquid mortar onto the cured contiguous coating. This results in a speckled or mottled appearance which is troweled to provide a plurality of interconnecting and non-interconnecting flattened and level plateaus partially covering the cementitious substrate to provide flattened speckeles partially covering the cementitious substrate.

Preferably, at least about 60% of the surface covered by the contiguous cementitious coating is covered by the noncontiguous cementitious coating. This extent of partially covering the contiguous coating enhances the grout line by the contrast between the contiguous and noncontiguous coatings. Most preferably, about 70% of the surface is covered by the noncontiguous cementitious coating.

An optional protective clear coating may be applied to the cementitious surface to prevent premature aging of the cementitious surface. Also, grit such as silica sand may be mixed with the clear coating and applied therewith to enhance skid resistance. Generally, the clear coating includes sun screens to protect against color fading and sealants to provide water and stain resistance to the cementitious surface. The application of a clear coating to the surface provides protection to the cementitious surface without substantially interfering with the inherent skid resistance of the cementitious surface. Skid resistance is desired in an outdoor or wet location. Application of a large number of clear coats tends to level the surface of the cementitious and to reduce, and possibly eliminate, the skid resistance of the cementitious surface. The clear coating can be selected from acrylic, epoxide or polyurethanes and the like based coating containing sun screens and sealants known in the art.

The second mortar is preferably sprayed onto the cured and if taped, taped first liquid mortar or the cementitious substrate by a spray gun or the like. Preferably, the viscosity of the first mortar is such that it may be sponged or squeegeed onto the surface of the substrate to provide a thin contiguous cementitious coating over the surface of the base.

In another embodiment of the invention the base is non-cementitious, such as wood, hardboard and the like which is covered with a cementitious coating in order to provide a cementitious substrate.

Where the substrate is cementitious such as concrete or masonry which has cured for more than about 24 hours, it is preferred that it be acid-etched prior to applying the first mixture in order to provide enhanced bonding between the cementitious substrate and the first liquid mortar. The preferred acid to degrease and etch concrete, masonry and the like is hydrofluoric acid. Where the cementitious substrate is provided by the first liquid mortar as taught in the process herein, acid etching would not be required since the second liquid mortar is applied shortly after the first liquid mortar has cured.

Preferably, the cement used to prepare the first and second mixtures is portland cement and the most preferred cement is white portland cement since it produces the most color brilliance and generally requires less pigment than the darker cements to produce a desired color.

For purposes of summarizing another invention, the invention may be incorporated into a process of preparing or repairing a roof structure. The process for preparing a roof structure over such substrates as plywood, with abutting joints being preferably taped, shingles, roll roofing, built-up roofing, etc., is to apply a roof coating composition comprising a mixture of concrete, sand, reinforcement fiber and an acrylic resin on to the substrate surface. The covering of the invention yields certain advantages not available in asphalt based products. For example, polystyrene panels which can be optionally shapped to such forms as barrel tile, etc., can be coated with the composition to provide a durable roof structure. Also, the covering composition can be used to repair a built-up roof by first removing the gravel and debris from the roof deck and applying the roof coating composition over the built-up roof. The coating composition is applied an amount of about 200 lbs/square. The use of this composition results in a decrease of about 500 lbs/square since the gravel which has been removed weights about 700 lbs/square.

The process of preparing a roof structure comprises the steps of preparing a roof coating composition by mixing cement, sand and reinforcement fiber to form a first mixture. An aqueous solution of acrylic resin is added to the first mixture to create a first fibered liquid mortar. The first fibered liquid mortar is applied onto the roof deck to form a contiguous coating of first fibered liquid mortar over the roof deck. The first fibered liquid mortar coating is allowed to cure to form a roof structure.

In another embodiment of invention the roof deck further includes previously applied roofing material covering the roof deck. This material is generally in a state of disrepair resulting in leakage into the covered structure further resulting in decay of the supporting structure, loss of property etc. The roofing composition of the invention is applied over the old roofing material at a thickness of about ⅛ to ¼ inch.

In another embodiment of invention the roof deck further includes securely attaching a plurality of foamed insulation panels to the roof deck. The first fibered liquid mortar is applied onto the insulation panels to form a contiguous coating of the first fibered liquid mortar over the plurality of foamed and closed cell insulation panels covering the roof deck.

A further advantage of the roofing composition is that a contrasting pigment may be added to the composition prior to application onto the roof deck. This enables the color of the roof to be selected from a plurality of colors.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which:

FIG. 1 schematically illustrates the acid etching of the substrate prior to applying the simulated marble surface;

FIG. 2 schematically illustrates the application of the first liquid mortar onto the acid etched surface of FIG. 1;

FIG. 3 schematically illustrates the application of the second liquid mortar onto the surface of the first liquid mortar as illustratively applied at FIG. 2;

FIG. 4 schematically illustrates the first and second liquid mortar coats being troweled;

FIG. 5 schematically illustrates the application of a sealant onto the coated surface of FIG. 4;

FIG. 6 schematically illustrates the acid etching of a cementitious substrate, such as concrete, prior to applying a first liquid mortar to the surface of the substrate;

FIG. 7 schematically illustrates the application of the first liquid mortar onto the acid etched surface of FIG. 6;

FIG. 7A is a plan view of FIG. 7;

FIG. 8 schematically illustrates the application of the strips of tape onto the surface of the cured first liquid mortar;

FIG. 8A is a plan view of FIG. 8;

FIG. 9 schematically illustrates the random application of the second liquid mortar onto at least about 60% of the entire surface of the taped and cured first liquid mortar to yield a noncontiguous thickened coating thereon;

FIG. 9A is a plan view of FIG. 9;

FIG. 10 schematically illustrates the removal of the tape from the cured surface;

FIG. 10A is a plan view of FIG. 10;

FIG. 11 schematically illustrates the application of a sealant onto the coated surface of FIG. 9; and FIG. 11A is a plan view of FIG. 11.

Similar reference characters refer to similar parts throughout the several views of the drawings.

DETAILED DESCRIPTION

The present invention discloses a process which is suitable for applying over new or existing substrates a new surface which simulates a marble appearance.

FIG. 1 schematically illustrates the application of the acid-etch composition 20 onto the surface 14 of a concrete substrate 16. The acid-etch composition comprises an aqueous solution of hydrofluoric acid which is used to degrease and otherwise prepare the concrete substrate to accept and bond the first liquid mortar.

FIG. 2 schematically illustrates the components of the first mixture namely, sand 24, cement 26 and optionally a first color pigment 22. Sand, as used in the described inventions herein, includes any fine aggregate material known to those skilled in the concrete making art. To this mixture is added an aqueous solution of an acrylic resin 28 to prepare a first liquid mortar 32. The mortar is preferably sprayed onto the previously acid-etched surface 14 set forth at FIG. 1. The first liquid mortar is sprayed such that the resultant surface appearance is textured in character 34 forming a first coat 36. In the event that a myraid of colors is desired, a plurality of single mixtures of cement and sand may be individually prepared to form a plurality of liquid mortars when the aqueous solution of an adhesive resin is added to the each single mixture of the plurality of mixtures to create a plurality of single mixtures of liquid mortars. A contrasting pigment selected from a plurality of contrasting pigments is added to at least one of the single mixtures of the plurality of liquid mortars such that the resulting pigment color of the single mixture liquid mortar contrasts with the other liquid mortars. The plurality of liquid mortars is then divided into a first portion of single mixture liquid mortars and a second portion of single mixture liquid mortars. Each single mixture of the first portion of liquid mortars is individually applied onto the substrate to form a first textured coat on the substrate. As schematically indicated at FIG. 2, the first coating should not be too thick such that the individual colors of the liquid mortars would be lost in the thickness. Each single mixture of the second portion of liquid mortars is then individually applied onto randomly spaced portions of the first textured coat prior to the complete curing of the first textured coat to enable the first and second coatings to form a unitary textured covering for the substrate with the contrasting pigments being randomly spaced in the textured unitary covering with the textured unitary coating having a lower layer and an upper layer with the lower layer comprising the first and second portions of liquid mortar and the upper layer comprising the second portion of liquid mortars such as illustrated at FIG. 3. The liquid mortars are individually applied in order to insure that each color brilliance is not blended to any detrimental extent prior to application. The contrasting pigments in the liquid mortars are allowed to commingle with the other of the liquid mortars and the pigmented areas to blend with the non-pigmented areas such as illustrated at FIG. 4. The non-pigmented areas are those liquid mortars without a contrasting pigment. The blended upper layer of the unitary textured covering of the substrate is troweled to simulate a marble surface having contrasting pigments such as illustrated at FIG. 5. As a practical matter only one liquid mortar without a color pigment is used in each first portion and second prtion of liquid mortars if such nonpigmented mortar is used.

FIG. 3 is a schematic illustration of the application of the second liquid mortar 40 onto the surface of FIG. 2 which illustrates the previously applied first liquid mortar 34. The second liquid mortar contains the same components of the first liquid mortar 32 and optionally a contrasting color pigment 42. The second liquid mortar 40 is applied to randomly spaced portions 41 of the first coating 36 prior to the compete curing of the first coating to form a second coating 38. This enables the first and second coatings to form a unitary textured coating 43 covering for the substrate with the contrasting pigment being randomly spaced in the textured unitary covering. As illustrated in FIG. 3, the textured unitary coating forms an upper layer 48 and a lower layer 46. The lower layer 46 comprises the first 32 and second 40 liquid mortars and the upper layer comprises the second liquid mortar 40. Portions of the second liquid mortar 40 fall into the lower layer 46 as well as comprise the upper layer 48. The thickness of the first and second coating together ranges from about $\frac{1}{8}$" to $\frac{1}{4}$", with each coat having essentially the same thickness.

FIG. 4 schematically illustrates the contrasting pigment 44 in the one of the first 32 and second 40 liquid mortars commingling with the other of the first and second liquid mortars to enable the pigmented areas to blend with the non-pigmented areas. A trowel 51 is illustrated troweling substantially only the upper layer 48 (discussed in greater detail below) to result in a textured simulated marble surface.

FIG. 5 schematically illustrates the application of a sealer 50 to the cured surface 52. The sealer protects the secured simulated marble surface by including sunscreens, sealants and the like in the composition.

Preferably, the proportions of the components of the first and second mixtures are about 1 part cement to about 2 parts sand. The preferred cement is portland cement and the most preferred portland cement is white portland cement since portland cement produces the most color brilliance and requires less pigment than the darker cements. Masonry cement may be used, however, it contains lime which may weaken the resulting surface. A complete mixture of sand and cement is available from Seamco Laboratories under the trademark FLO-CRETE and is the most preferred mixture.

Aqueous solutions of adhesive resins are commercially available. The preferred adhesive resin is an aqueous solution of an acrylic resin readily available from Union Carbide available under the trademarks UCAR 503, UCAR 380 and UCAR 505 and from Rohm and Haas available under the trademarks RHOPLEX AC64, AC 490 and AC 507. An aqueous adhesive resin is also available from Seamco Laboratories.

The colorants are readily available from Nuodix, G P Colortund, Universal Color Dispersion Co., Cardinal Color Co. and UCD Universal Colorant and from other suppliers known in the art.

The sand and cement are mixed with the aqueous solution of the resin in a ratio of about 10 pounds of resin solution to about 50 pounds of sand and cement mix which gives a fluid consistency or flowability of a thick pancake batter to the mortar. If the mortar has a greater flowability (less viscous) the resultant coating has a smoother texture. If the mortar has less flowability (more viscous) the resultant coating has a courser texture. The mortar, which may include a colorant, is completely mixed to insure complete dispersion of the ingredients such that the resulting mortar will pour or spray without separation of the ingredients.

By way of example and for illustration the process for covering an existing concrete slab, such as a driveway, includes cleaning the surface of the concrete slab by degreasing and preparing the surface for bonding by applying an acid-etching solution to the surface of the concrete. An aqueous solution of hydrofluoric acid is preferred. This solution is diluted with water up to about 3:1 (water to acid), or used full strength, and evenly applied to the slab surface in a manner well known to those in the art. The spent acid solution is then washed off by spray washing the surface with water, forced upon the surface under combined water and air pressure to provide an enhanced cleansing action upon the surface. The first liquid mortar may be applied to the surface of the concrete while it is still damp thereby enhancing the bonding between the concrete and the mortar. The mortar may also be applied to a dry surface.

Portland cement, preferably white portland cement, and sand, specifically mortar sand which is a very fine powder-like sand, is mixed at the preferred ratio of 2 parts sand to 1 part cement forming a first mixture. A second mixture is prepared the same way as the first except that a contrasting color pigment, for example black, is added to contrast the second mixture. An aqueous solution of acrylic resin is then added at a ratio of about 10 pounds of resin solution to about 50 pounds of sand and cement mix to both the first and second mixtures to prepare a first and second liquid mortar, respectively.

The first liquid mortar is sprayed onto the concrete surface using a Kraft Texture Gun, at about 15 psi pressure, which mixes the mortar and air producing a textured coat, designated the first coating, of the first liquid mortar over the entire surface of the concrete slab. The resultant sprayed surface or coat may be best described as a plurality of separate "plateaus" upon a flat lower region. This coat is known as the lower layer.

Prior to the complete curing of the first liquid mortar the second liquid and pigment containing mortar is then randomly sprayed onto the concrete surface using a Kraft Texture Gun. The second liquid mortar is preferably applied at a higher pressure, about 20–22 psi, than the first liquid mortar to enhance blending and commingling. This coat, designated the second coating, may be best described as a plurality of overlying "plateaus" randomly placed upon the previously applied first coat or liquid mortar. The second liquid mortar "plateaus" fall upon the sprayed first coat at: (1) "plateaus" of the first coat, (2) flat lower region of the first coat, and (3) partially on the "plateaus" and partially on the flat lower region of the first coat. Only those "plateaus" of the second liquid mortar which are resting upon the the "plateaus" of the first liquid mortar are considered comprising the upper layer. Where a plurality of liquid mortars having contrasting pigments are applied, care must be taken to retain the distinction between the lower layer and the upper layer such that the troweling of the upper layer can achieve the textured appearance indicative of marble. The textured appearance is achieved by not troweling to any substantial extent into the lower layer so as to obliterate the lower layer although some troweling into the lower layer, such as by bulldozing a small portion of the upper layer over the lower layer, may be unavoidable to attain a troweled and flattened upper layer. Extensive troweling into the lower layer would result in a smooth surface without the "voids" in the troweled upper layer which permit the untroweled lower layer to present its textured appearance to the viewer and hence its marbleized appearance. A totally smooth upper layer which is absent any "voids" in the upper layer would not present a marble-like surface having a textured appearance. Therefore, substantially only the resultant blended upper layer is troweled to reveal blended-streaky alterations of light and dark to simulate a textured marble surface which may be described as lightly troweling the upper layer.

The contrasting pigments are allowed to commingle with the non-pigmented areas indicated by a blending about the periphery or boundary of the pigmented and non-pigmented areas. Blending occurs in both the lower area and upper area. Temperature and humidity influence the curing rate. Thus, the greatest extent of blending is achieved at low temperatures and high humidity because of the delayed curing.

The simulated marble surface may be coated with a protectant coating, such as an epoxy based coating, as soon as the applied surface hardens or cures. While the time for curing is dependant upon temperature and humidity, generally about 20 minutes after trowelling is sufficient.

PINK-GRAY-WHITE SIMULATED TEXTURED MARBLE SURFACE

White portland cement, and mortar sand is mixed at the preferred ratio of 2 parts sand to 1 part cement to form a first mixture. A second mixture is prepared the same way as the first except that a pink color pigment (AQI 2199 red oxide Cardinal Color Co.) is added to the second mixture at about 1 fluid ounce (by volume) for each 50 pounds sand and cement mix prepared. A third mixture is prepared the same way as the first except that a black color pigment (AQI 9104 black iron oxide Cardinal Color Co.) is added to the third mixture at about 1 fluid ounce (by volume) for each 50 pounds sand and cement mix prepared. An aqueous solution of acrylic resin is added at a ratio of about 10 pounds of resin solution to about 50 pounds of sand and cement mix to each of the first, second and third mixtures to prepare a first (white), a second (pink) and a third (gray) liquid mortar, respectively.

The first liquid mortar is sprayed onto the concrete surface using a Kraft Texture Gun, at about 15 psi and an air tip bore of 3/32 inch, which mixes the mortar and air producing a textured coat, designated the first coating, of the first liquid mortar over the entire surface of the wood test piece. Prior to the complete curing of the first liquid mortar, the second liquid pigment containing mortar and the third liquid pigment containing mortar is randomly sprayed onto the coated wood surface using a Kraft Texture Gun at about 20–22 psi and an air tip bore of ⅛ inch. The pink and gray pigment is allowed to commingle with the nonpigmented areas for about 5 minutes. The upper layer is troweled to reveal the blended-streaky alterations of white, gray and pink to simulate a textured marble surface. About 20-23 minutes after troweling, the surface is cured enough to be coated with an epoxy based coating. Strips of tape may also be used in the manner described to attain the ceramic tiled appearance in the preparation of a marbleized tiled surface by forming grout lines upon removing the strips of tape to present a marbleized tiled appearance.

In a further process which is suitable for applying over new or existing substrate a new surface which simulates a ceramic appearance or a ceramic tile having a mottled, speckled appearance.

FIG. 11 schematically illustrates the application of the acid-etch composition 120 onto the surface 114 of a concrete substrate 116. The acid-etch composition comprises an aqueous solution of hydrofluoric acid which is used to degrease and otherwise prepare the concrete substrate to accept and bond the first liquid mortar.

FIG. 7 schematically illustrates the application of the first liquid mortar 130 onto the acid-etched surface 114 of FIG. 11. The components of the first mixture namely, sand 124, cement 126 and optionally a first color pigment 122 are completely mixed together to insure homogenous dispersion of the components. To this mixture is added an aqueous solution of an an adhesive resin such as an acrylic resin 128 to prepare a first liquid mortar 130. The resulting first liquid mortar 130 is prepared with enough resin such that is has the consistency of water or of a low viscosity to enable application onto the surface 114 of the concrete substrate 160 with a sponge, squeegee or the like. The mortar is preferably squeegeed onto the previously acid-etched surface 114 set forth at FIG. 6. The first liquid mortar 130 is applied such that the resulting surface is substantially smooth 134 and forms a cured first coat 136. In the event that the cementitious substrate 115 is of the desired color, the application of a first liquid mortar onto the surface of the cementitious substrate is not required. The second liquid mortar may then be applied directly to the cementitious substrate to produce the desired appearance of the invention.

FIG. 8 schematically illustrates the application of the strips of tape 138 onto the surface of the cured 140 first liquid mortar 130 as illustratively applied at FIG. 7. In the event a first liquid mortar 130 is not applied, the strips of tape 138 are applied directly to the cementitious substrate 115 prior to applying the second liquid mortar 142. The step of applying strips of tape 138 may be omitted with a contiguous ceramic appearance is desired rather that a ceramic tiled appearance.

Strips of tape may also be used in the manner described to attain the ceramic tiled appearance in the preparation of the marbleized tiled surface by providing grout lines to present a marbleized tiled appearance. However, in the marbleized surface the tape should be set down before application of the first liquid mortar or application of the first portion of liquid mortars since the layer to which the straight edge tape is releasably secured to should be stable, i.e., cured. On very small areas it may be possible to releasably position the tape onto an uncured layer prior to application of an upper layer, but the advantage gained would be quite small in view of the labor involved and of possible movement of the tape on the uncured surface resulting in misshaped grout lines.

FIG. 9 schematically illustrates the random application of the second liquid mortar 142 onto the surface of the taped and cured 140 first liquid mortar 130 as illustratively applied at FIG. 9. The second liquid mortar 142 contains the same components of the first liquid mortar 130. A contrasting color pigment 144 relative to color pigment 122 or the first liquid mortar 130 without a color pigment. A contrasting pigment 122,144 is added and mixed to at least one of the first 130 and second 142 mortars such that one of the first 130 and second 142 mortars has a color which contrasts with the color of the other one of the first 130 and second 142 mortars to enhance the visual perception of the ceramic appearance. The second liquid mortar 142 is applied to randomly spaced portions 141 of the taped and cured first coating 140 to form a noncontiguous coating 148. The noncontiguous coating 148 is described as a plurality of specks or blotches 150 partially covering the cured first coating 140. As illustrated in FIG. 7, the smooth 134 first coating 136 is a thin film which contiguously and evenly covers the entire surface of the substrate 114. Whereas the noncontiguous coating which forms the plurality of interconnecting 145 and non-interconnecting 147 flattened and level plateaus or blotches partially covers the cementitious substrate. The noncontiguous coating is randomly shaped and is about ⅛ of an inch thick prior to troweling. Since the viscosity of the second liquid mortar is high, resembling very thick pancake batter, it does not spread over the surface of the cementitious substrate without troweling.

FIG. 10 schematically illustrates the troweled second liquid mortar 146 or noncontiguous thickened cementitious coating to form a plurality of interconnecting and non-interconnecting flattened and level plateaus partially covering the cementitious substrate to provide flattened speckles partially covering the cementitious substrate. The second liquid mortar 146 coats over portions of the cured 140 first liquid mortar 130 or in the event a first cured liquid mortar is not used, partially coats over the cementitious substrate. FIG. 10 further schematically illustrates the surface of the invention 110 with the tape 138 removed from the cured, troweled noncontiguous coating 158. The removal of tape 138 reveals the cured contiguous coating thereunder to simulate cementitious grout-lines 160 between the simulated mottled and speckled ceramic surface of ceramic tile 162. The cured coating may be described as the cementitious substrate partially covered with a flattened and shaped pattern over the cementitious substrate simulating a mottled, speckled ceramic covering. If tape is applied the cured coating of the substrate may be described as a cementitious substrate partially covered with a flattened and shaped pattern over the cementitious substrate simulating a mottled, speckled ceramic tile and to reveal the cementitious substrate representing grout lines where the second mortar covered the tape to yield grout lines of the cementitious substrate simulating a plurality of mottled and speckled ceramic tiles. In each application the troweled second liquid mortar forming the flattened and shaped pattern is elevated relative to the cementitious substrate. That is, the troweled second mortar results in plateaus rising above the surface of the cementitious substrate.

FIG. 11 schematically illustrates the application of a sealer 150 to the cured surface 156. The sealer protects the secured cementitious surface by including stain resistants, sunscreens, sealants and the like in the composition.

Preferably, the proportions of the components of the first and second mixtures are about 1 part cement to about 2 parts sand. The preferred cement is portland cement and the most preferred portland cement is white portland cement since white portland cement produces the most color brilliance and requires less pigment than the darker cements. Masonry cement may be used, however, it contains lime which may weaken the resulting surface. A complete mixture of sand and cement is available from Seamco Laboratories of Tampa, Fla. under the trademark FLO-CRETE which is the most preferred mixture.

The aqueous solutions of acrylic resins are readily available from Union Carbide available under the trademarks UCAR 503, UCAR 380 and UCAR 505 and from Rohm and Haas available under the trademarks RHOPLEX AC64, AC 490 and AC 507.

The colorant pigments are readily available from Nuodix, G P Colortund, Universal Color Dispersion Co., Cardinal Color Co. and UCD Universal Colorant and from other suppliers known in the art.

The second liquid mortar is prepared by mixing sand and cement with the aqueous solution of an adhesive resin in a ratio of about 10 pounds of resin solution to about 50 pounds of sand and cement mix which gives a fluid consistency or flowability of a thick pancake batter to the mortar. The mortar, which may include a colorant, is completely mixed to insure complete dispersion of the ingredients such that the resulting mortar will pour or spray without separation of the ingredients.

The first liquid mortar is prepared the same way as the second liquid mortar, except that a greater amount of adhesive resin is used in the first liquid mortar in order to lower the viscosity of the resulting composition. A lower viscosity enables application of the first liquid mortar by a squeegee, sponge or the like.

By way of example and for illustration the process for covering an existing concrete slab, such as a driveway, includes cleaning the surface of the concrete slab by degreasing and preparing the surface for bonding by applying an acid-etching solution to the surface of the concrete. An aqueous solution of hydrofluoric acid is preferred. This solution is diluted with water up to about 3:1 (water to acid), or used full strength, and evenly applied to the slab surface in a manner well known to those in the art. The spent acid solution is then washed off by spray washing the surface with water, forced upon the surface under combined water and air pressure to provide an enhanced cleansing action upon the surface. The first liquid mortar may be applied to the surface of the concrete while it is still damp thereby enhancing the bonding between the concrete and the mortar. The first liquid mortar may also be applied to a dry surface.

Portland cement, preferably white portland cement, and sand, specifically mortar sand which is a very fine powder-like sand, is mixed at the preferred ratio of 2 parts sand to 1 part cement forming a first mixture. A second mixture is prepared the same way as the first mixture. A contrasting color pigment is added to either of or both of the first and/or second mixture to enhance the visual perception of the speckle and the color gradations radiating therefrom. An aqueous solution of an adhesive resin, such as an acrylic resin is then added at a ratio of about 10 pounds of resin solution to about 50 pounds of sand and cement mix to both the first and second mixtures to prepare a first and second liquid mortar, respectively. The first liquid mortar is then further diluted with the adhesive resin in order to lower the viscosity such that the first liquid mortar may be squeegeed onto the concrete surface using a squeegee applicator, known in the art, to produce a smooth contiguous cementitious coating over the entire surface of the concrete slab.

Once the first liquid mortar has cured, tape is releasably secured to the contiguous coating in any desired pattern. The tape represents the grout outline surrounding grouted tile. Preferably, the tape comprises an elongate strip-shape having straight edges as illustrated at FIG. 8.

The second liquid mortar is randomly and preferably sprayed onto the contiguous coating using a Kraft Texture Gun, at about 15–22 psi pressure, which mixes the mortar and air to produce a noncontiguous coating. The resultant sprayed surface or coat may be best described as a plurality of specks or blotches upon portions of the taped contiguous coating.

Prior to the complete curing of the second liquid mortar the entire surface of the coated substrate is troweled to form a plurality of noninterconnecting and interconnecting, flattened level plateaus partially covering the cementitious substrate.

After the cementitious surface is completely cured the tape is removed to reveal the cured first liquid mortar thereunder to simulate cementitious grout-lines between tiles thereby simulating a tiled surface having a ceramic appearance.

The cured cementitious surface may be coated with a protectant coating, such as an epoxy based coating, either before removing the tape or after the tape is removed. While the time for curing is dependant upon temperature and humidity, generally about 20 minutes after trowelling is sufficient.

GOLD SIMULATED CERAMIC WITH A MOTTLED SPECKLED APPEARANCE

A skim coat (watery or having viscosity approximate water) of the natural (color) Design Flo-Crete mix is applied to the surface of the hardboard and allowed to cure. The Flo-Crete additive is stirred and 18 or 20 cups of Seamco's Flo-Crete adhesive additive is measured into a clean, dry 5 gallon bucket. Add 50# bag of Seamco's dry mix to the additive, slowly while mixing. Mix at a low speed for approximately 4 minutes. Blend into the mix two fluid ounces of gold Kolor Kote concentrate per about 5 gal. of dry mix to achieve the desired color. Let mix sit for 5 minutes, re-mix again for 1 minute.

Fill hopper-sprayer with mix and apply evenly to surface covering approximately 70% of the total surface so as to not obliterate the underlying skim coated cementitious substrate. The noncontiguous thickened cementitious coating is troweled to form a plurality of gold interconnecting and non-interconnecting, flattened and level plateaus partially covering the natural cementitious substrate to provide flattened raised speckles partially covering the cementitious substrate. The troweled coating is allowed to cure to reveal the cementitious substrate partially covered with a flattened and shaped pattern over the cementitious substrate simulating a mottled, speckled ceramic tile and to reveal the cementitious substrate representing grout lines where the second mortar (gold) covered the tape to yield grout lines of the cementitious substrate simulating a plurality of mottled and speckled ceramic tiles. The surface is allowed to cure. After curing, the tape is removed. The surface is then lightly scraped if needed, to remove any burrs or loose material and coated with a protectant coating. Strips of tape may also be used in the manner described above to attain a ceramic tiled appearance.

The present disclosure includes that contained in the appended claims as well a that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A process for covering a substrate with a simulated marble surface comprising:
   mixing cement and sand to form a first mixture;
   adding an aqueous solution of an adhesive resin to the first mixture to create a first liquid mortar;
   mixing cement and sand to form a second mixture;
   adding an aqueous solution of an adhesive resin to the second mixture to create a second liquid mortar;
   adding and mixing a contrasting pigment to each one of the first and second mortars such that color of the first mortar contrasts with the color of the second mortar;
   applying the first liquid mortar onto the substrate to form a first textured coat on the substrate;
   applying the second liquid mortar onto randomly spaced portions of the first coating prior to the complete curing of the first coating enabling the first and second coatings to form a unitary textured covering for the substrate with the contrasting pigment being randomly spaced in the textured unitary covering with the textured unitary coating having a lower layer and an upper layer with the lower layer comprising the first and second liquid mortar and the upper layer comprising the second liquid mortar;
   allowing the contrasting pigment in each of the first and second liquid mortars to commingle with the other of the first and second liquid mortars to enable the contrasting pigmented areas of the first mortar to blend with the contrasting pigmented areas of the second mortar; and
   troweling substantially only the blended upper layer of the unitary textured covering on the substrate to simulate a marble surface.

2. The process of claim 1 wherein the first and second mortars are applied by spraying.

3. The process of claim 2 wherein the first mortar is sprayed through a small bore aperture to provide a fine textured appearance and the second mortar is sprayed through a larger bore aperture to provide a coarse textured appearance.

4. The process of claim 1 including applying a clear coating to seal and protect the simulated marble surface against accelerated aging caused by sun and water.

5. A process as in claim 4 wherein the clear coating is selected from the group consisting of: acrylics, epoxides, and urethanes.

6. The process of claim 1 wherein the substrate is selected from the group consisting of concrete, wood, hardboard and masonry.

7. The process of claim 6 wherein the concrete is acid-etched prior to applying the first mixture in order to provide bonding between the concrete substrate and the first liquid mortar of the lower layer.

8. A marbleized covering of a substrate comprising the covering prepared by the process of claim 1.

9. A process for covering a substrate with a simulated marble surface comprising:
   mixing cement and sand to form a first mixture;
   adding an aqueous solution of adhesive resin to the first mixture to create a first liquid mortar;
   mixing cement and sand to form a second mixture;
   adding an aqueous solution of adhesive resin to the second mixture to create a second liquid mortar;
   mixing cement and sand to form a third mixture;
   adding an aqueous solution of adhesive resin to the third mixture to create a third liquid mortar;
   mixing a first contrasting pigment to one of the first, second and third mortars;
   mixing a second contrasting pigment which contrasts with the first contrasting pigment to the one of the first, second and third mortars which does not contain the first contrasting pigment;
   applying the first liquid mortar onto the substrate to form a first textured coat on the substrate;
   applying the second liquid mortar onto randomly spaced portions of the first coating prior to the complete curing of the first coating;
   applying the third liquid mortar onto randomly spaced portions of the first coating prior to the complete curing of the first coating enabling the first, second and third coatings to form a unitary textured covering for the substrate with the first and second contrasting pigment being randomly spaced in the textured unitary covering with the textured unitary coating having a lower layer and an upper layer, with the lower layer comprising the first, second and third liquid mortars and the upper layer comprising the second and third liquid mortars;
   allowing the first contrasting pigments and the second contrasting pigments in the liquid mortars to commingle and the pigmented areas to blend with the non-pigmented areas; and
   troweling substantially only the blended upper layer of the unitary textured covering of the substrate to simulate a marble surface having contrasting pigments.

10. The process of claim 9 wherein the first and second mortars are applied by spraying.

11. The process of claim 10 wherein the first mortar is sprayed through a small bore aperture to provide a fine textured appearance and the second mortar is sprayed through a larger bore aperture to provide a coarse textured appearance.

12. The process of claim 9 including applying a clear coating to seal and protect the simulated marble surface against accelerated aging caused by sun and water.

13. A process as in claim 12 wherein the clear coating is selected from the group consisting of: acrylics, epoxides, and urethanes.

14. The process of claim 9 wherein the substrate is selected from the group consisting of concrete, wood, hardboard and masonry.

15. The process of claim 14 wherein the cementitious substrate is acid-etched prior to applying the first mixture in order to provide bonding between the concrete substrate and the first liquid mortar of the lower layer.

16. A marbleized covering of a substrate prepared by the process of claim 9.

17. A process for covering a substrate with a simulated marble surface comprising:

mixing cement and sand to form a plurality of mixtures where each mixture of the plurality of mixtures comprises a single mixture of cement and sand;

adding an aqueous solution of an adhesive resin to the each single mixture of the plurality of mixtures to create a plurality of single mixtures of liquid mortars;

providing a plurality of contrasting pigments;

mixing a contrasting pigment selected from the plurality of contrasting pigments to at least one of the single mixtures of the plurality of liquid mortars such that the resulting pigment color of the single mixture liquid mortar contrasts with the other liquid mortars;

dividing the plurality of liquid mortars into a first portion of single mixture liquid mortars and a second portion of single mixture liquid mortars;

individually applying each single mixture of the first portion of liquid mortars onto the substrate to form a first textured coat on the substrate;

individually applying each single mixture of the second portion of liquid mortars onto randomly spaced portions of the first textured coat prior to the complete curing of the first textured coat to enable the first and second coatings to form a unitary textured covering for the substrate with the contrasting pigments being randomly spaced in the textured unitary covering with the textured unitary coating having a lower layer and an upper layer with the lower layer comprising the first and second portions of liquid mortar and the upper layer comprising the second portion of liquid mortars;

allowing the contrasting pigments in the liquid mortars to commingle with the other of the liquid mortars and the pigmented areas to blend with the non-pigmented areas; and troweling substantially only the blended upper layer of the unitary textured covering of the substrate to simulate a marble surface having contrasting pigments.

18. A marbleized covering of a substrate prepared by the process of claim 17.

19. A marbleized covering of a substrate prepared by process comprising:

mixing cement and sand to form a first mixture;

adding an aqueous solution of an adhesive resin to the first mixture to create a first liquid mortar;

mixing cement and sand to form a second mixture;

adding an aqueous solution of an adhesive resin to the second mixture to create a second liquid mortar;

adding and mixing a contrasting pigment to one of the first and second mortars such that color of the first mortar contrasts with the color of the second mortar;

applying the first liquid mortar onto the substrate to form a first textured coat on the substrate;

applying the second liquid mortar onto randomly spaced portions of the first coating prior to the complete curing of the first coating enabling the first and second coatings to form a unitary textured covering for the substrate with the contrasting pigment being randomly spaced in the textured unitary covering with the textured unitary coating having a lower layer and an upper layer with the lower layer comprising the first and second liquid mortar and the upper layer comprising the second liquid mortar;

allowing the contrasting pigment in one of the first and second liquid mortars to commingle with the other of the first and second liquid mortars to enable the pigmented areas to blend with the non-pigmented areas; and troweling substantially only the blended upper layer of the unitary textured covering on the substrate to provide a simulated marbleized coating of the substrate.

* * * * *